United States Patent [19]
Tamai

[11] Patent Number: 5,964,864
[45] Date of Patent: *Oct. 12, 1999

[54] INFORMATION PROCESSING APPARATUS FOR SEPARATELY PROCESSING CODE INFORMATION AND PATTERN INFORMATION

[75] Inventor: Ryo Tamai, Kawasaki, Japan

[73] Assignee: Ricoh Company, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/627,076

[22] Filed: Apr. 3, 1996

[30] Foreign Application Priority Data

Apr. 4, 1995 [JP] Japan ..................... 7-079114

[51] Int. Cl.$^6$ ........................................ G06F 15/16
[52] U.S. Cl. ............................... 712/34; 345/501
[58] Field of Search ............ 395/800.34, 800.35; 345/501, 502, 503, 504, 505, 506; 712/34

[56] References Cited

U.S. PATENT DOCUMENTS

| | | | |
|---|---|---|---|
| 4,862,155 | 8/1989 | Dalrymple et al. | 345/435 |
| 5,530,797 | 6/1996 | Uya et al. | 345/508 |
| 5,561,815 | 10/1996 | Takata et al. | 395/833 |
| 5,680,524 | 10/1997 | Maples et al. | 395/127 |
| 5,684,534 | 11/1997 | Harney et al. | 348/390 |
| 5,684,935 | 11/1997 | Demese, III et al. | 395/119 |
| 5,710,895 | 1/1998 | Gerber et al. | 345/327 |

FOREIGN PATENT DOCUMENTS 5-303596  11/1993  Japan.

*Primary Examiner*—Meng-Ai T. An
*Assistant Examiner*—Walter D. Davis, Jr.
*Attorney, Agent, or Firm*—Oblon, Spivak, McClelland, Maier & Neustadt, P.C.

[57] ABSTRACT

An information processing apparatus has a processing unit exclusively used for code information and a processing unit exclusively used for pattern information so that a total processing speed and a processing efficiency is increased when both the code information and the pattern information are processed by the same information processing apparatus. A code information processing unit exclusively processes the code information. A pattern information processing unit exclusively processes the pattern information, the pattern information processing unit being separated from the code information processing unit. Inputting/outputting information to/from each of the code information processing unit and pattern information processing unit is controlled so that a suitable processing can be applied to each of the code information requiring a relatively small processing capability and the pattern information requiring a relatively large processing capability. Thus, a speed and efficiency of processing are increased in the information processing apparatus as a whole system.

24 Claims, 8 Drawing Sheets

INFORMATION PROCESSING APPARATUS FOR SEPARATELY PROCESSING CODE INFORMATION AND PATTERN INFORMATION

BACKGROUND OF THE INVENTION

1. Field of the Invention

The present invention generally relates to an information processing apparatus and, more particularly, to an information processing apparatus which concurrently processes code information and pattern information.

2. Description of the Related Art

FIG. 1 shows a conventional information processing apparatus used as a part of an office automation system. The information processing apparatus shown in FIG. 1 comprises a computation control unit 1, a keyboard 2, a mouse 3, a display unit 4, an external memory apparatus 5 and a printer 6. The computation control unit 1 is comprised of a personal computer or an end terminal unit of a UNIX system. The keyboard is used for inputting information from an operator. The mouse is used as a pointing device. The display apparatus 4 comprises a screen such as a cathode ray tube (CRT) to display input information or a result of processing. The external memory apparatus 5 comprises a floppy disk drive (FDD), a hard disk drive (HDD) or a magneto-optical (MO) disk drive so as to record information therein. The printer 6 prints a result of processing onto a recording sheet.

The computation control unit 1 comprises, as shown in FIG. 2, a central processing unit (CPU) 11, a memory unit 12, a font unit 13, and various drivers 14–18. The CPU 11 controls an entire operation of the computation control apparatus 1. The memory unit 12 comprises a memory for storing an operation system (OS) program or an application program for operating the CPU 11 and a memory used as a working area for the CPU 11. The font unit 13 stores font information used for converting code information into image information. The driver 14 controls communications with the keyboard 2 and the mouse 3. The driver 15 controls communications with the display unit 4. The driver unit 16 controls communications with the external memory unit 5. The driver 17 controls communications with the printer 6. The driver 18 controls communications with an external apparatus (terminal) which is connected via a network such as a local area network (LAN).

An early data processing system (computation control apparatus) had a simple structure such as described above since operations to be performed were simple. Additionally, the above-mentioned conventional structure of the computation control apparatus was sufficient since most of the early computation control apparatuses were operated as closed systems, that is, most of the computation control apparatus were operated as stand-alone systems.

However, in recent years, a need for processing pattern information (image information) has drastically increased as has a need for processing code information. This is because the information processing apparatus is used for processing pattern information such as audio information and video information such as those processed in a multi-media system. Additionally, a need for background processing, which is to be performed concurrently with processing of a main job, is increased. This requires multi-task processing. Accordingly, the conventional structure of the hardware and software of the information processing apparatus should be changed to more efficiently process the information including both the code information and the pattern information.

In order to process the code information and the pattern information, a conventional computation control apparatus 20 shown in FIG. 3 has a complex structure. That is, the computation control apparatus 20 comprises, further to the computation control apparatus 1 shown in FIG. 2, an image editing unit 21, a compressing/extending unit 22, a drawing unit 23, an optical character reader (OCR) 25 and drivers 24 and 26. The image editing unit 21 edits the image information. The compressing/extending unit 22 increases a transmission speed of the image information. The drawing unit 23 performs a drawing operation. The driver 24 receives the image information read by a scanner 7. The OCR 25 converts the image information received by the scanner into code information. The driver 26 comprises a modem to control communications with external apparatuses via a telephone line. Additionally, the CPU 11 of this apparatus further has a function to read and process image information and audio information from new media such as a CD-ROM.

That is, the computation control apparatus 20 performs processing of both the code information and the pattern information which requires a high processing speed. Additionally, a high reliability is required as the apparatus becomes more complex.

Accordingly, in the information processing apparatus having the above-mentioned structure, the concurrent processing of the code information and the pattern information has become a serious problem since the capability of the apparatus for processing the code information is different from the capability required for processing the pattern information. That is, the processing system used for the code information is normally operated as a serial processing system in which a plurality of tasks in a single job are serially processed, whereas the processing system used for the pattern information is normally operated as a parallel system in which a plurality of tasks are concurrently processed. Thus, the processing of the pattern information requires a greater capability of the CPU than that of the code information. Additionally, the size of a data bus used for the code information processing system can be much less than the size of a data bus for the pattern information processing system. Accordingly, if the code information is processed by the same processing system as the processing system used for the pattern information, the processing system has too much capacity for processing the code information. Thus, a CPU having an unnecessarily large capability must be used when both methods of processing are performed by a single CPU.

For example, if the code information such as command information and the pattern information such as audio information are processed by the same CPU, there may be a problem that processing the audio information is interrupted when the code information is processed. For example, in a case where the code information is processed as a main job and the audio information is processed as background music, the processing of the background music must be interrupted while the code information is processed. The interruption may last for a very short period of time, but it may be recognizable by the user.

Additionally, it has been suggested that file data having code information be added to the front end of the pattern information as shown in FIG. 4. This kind of data format has been suggested in Japanese Laid-Open Patent Application No.5-303596 filed by the present applicant. The file of information shown in FIG. 4 has a sub-data area and a main-data area. The sub-data area contains only code information and the main-data area contains the pattern information. The code information in the sub-data area is used for controlling the processing of the pattern information in the main-data area. When the file data of this kind is processed, input data input from the external apparatus to the computation control apparatus contains both the code information and the pattern information. In the conventional computation control apparatus, the code information and the pattern information are processed by the same CPU. Accordingly, the capability of the CPU must be determined to have such a capacity sufficient to process the pattern information. Thus, the capability of the CPU is larger than necessary for processing the code information.

SUMMARY OF THE INVENTION

It is a general object of the present invention to provide an improved and useful information processing apparatus in which the above-mentioned problems are eliminated.

A more specific object of the present invention is to provide an information processing apparatus which has a processing unit exclusively used for code information and a processing unit exclusively used for pattern information so that a total processing speed and a processing efficiency are increased when both the code information and the pattern information are processed by the same information processing apparatus.

In order to achieve the above-mentioned objects, there is provided according to the present invention an information processing apparatus for concurrently processing code information and pattern information, comprising:

a code information processing unit exclusively processing the code information;

a pattern information processing unit exclusively processing the pattern information, the pattern information processing unit being separated from the code information processing unit; and management control means for controlling inputting/outputting information to/from each of the code information processing unit and pattern information processing unit.

According to the above-mentioned invention, since the code information processing unit and the pattern information processing unit are separated from each other, a suitable processing can be applied to each of the code information requiring a relatively small processing capability and the pattern information requiring a relatively large processing capability. Thus, a speed and an efficiency of processing are increased in the information processing apparatus as a whole system. Additionally, an efficient hardware design can be achieved.

In one embodiment, the management control means may be provided in at least one of the code information processing unit and the pattern information processing unit. The management control means may be provided in each of the code information processing unit and the pattern information processing unit.

Additionally, peripheral devices handling code information may be connected to the code information processing unit, and peripheral devices handling pattern information may be connected to the pattern information processing unit.

The information processing apparatus according to the present invention may further comprise a bus interconnecting the code information processing unit and the pattern information processing unit. Each of the code information processing unit and the pattern information processing unit may comprise a memory unit to which the bus is connected.

Additionally, in the information processing apparatus according to the present invention, the code information processing unit, the pattern information processing unit and the bus are integrated into a single LSI package.

Further, the information processing apparatus according to the present invention may further comprise comparing means for comparing a first output of the code information processing unit with a second output of the pattern information processing unit so as to determine whether or not the second output is equal to the first output, the comparing means determining that the second output is correct when the second output is equal to the first output. The determination of the comparing means may be made by performing an AND operation with respect to the first output and the second output.

Further, the information processing apparatus according to the present invention may further comprise:

synthesizing means for synthesizing a first output of the code information processing unit and a second output of the pattern information processing unit in accordance with a logical operation so as to output a third output;

a control system controlling an operation in accordance with the third output supplied by the synthesizing means so as to feed back a result of processing performed by the code information processing unit and the pattern information processing unit; and difference calculation means for calculating a difference between target information input from external apparatus and the result of processing so as to input the difference to the code information processing unit to correct the second output of the pattern information processing unit.

Further, in the information processing apparatus according to the present invention, a set of information including the code information and the pattern information is input to the management control means, and the management control means separates the code information and the pattern information from each other so that the code information is input to the code information processing unit and the pattern information is input to the pattern information processing unit.

Other objects, features and advantages of the present invention will become more apparent from the following detailed description when read in conjunction with the accompanying drawings.

DETAILED DESCRIPTION OF THE PREFERRED EMBODIMENTS

Figure 5:
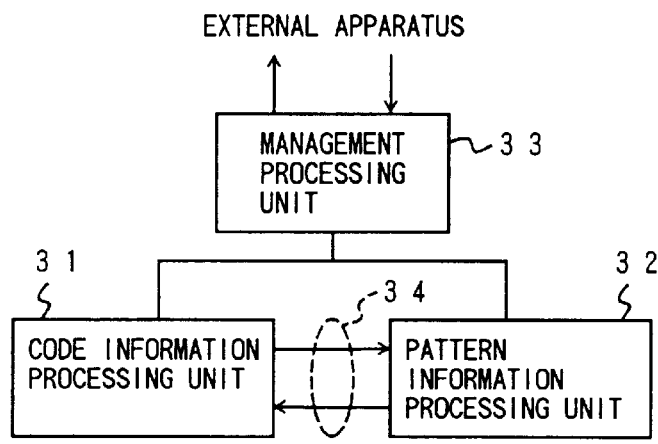
FIG. 5 is a block diagram of an information processing apparatus according to a first embodiment of the present invention.

A description will now be given of a first embodiment of the present invention. FIG. 5 is a block diagram of an information processing apparatus according to the first embodiment of the present invention.

The information processing apparatus according to the first embodiment comprises a code information processing unit 31, a pattern information processing unit 32 and a management processing unit 33. The code information processing unit 31 exclusively processes code information. The pattern information processing unit 32 is separated from the code information processing unit 32, and exclusively processes pattern information. The management processing unit 33 manages the operation of the code information processing unit 31 and the pattern information processing unit 32. The code information processing unit 31 and the pattern information processing unit 32 are connected via a high-speed bus 34.

In the information processing apparatus, information from an external apparatus is separated into code information and pattern information by the management processing unit 33. The code information is distributed to the code information processing unit 31 and the pattern information is distributed to the pattern information processing unit 32. The code information processing unit 31 directly requests via the high-speed bus 34 the pattern information processing unit 32 to send necessary pattern information when the pattern information is needed while the code information is processed. Similarly, the pattern information processing unit 32 directly requests via the high-speed bus 34 the code information processing unit 31 to send necessary code information when the code information is needed while the pattern information is processed.

Figure 6:
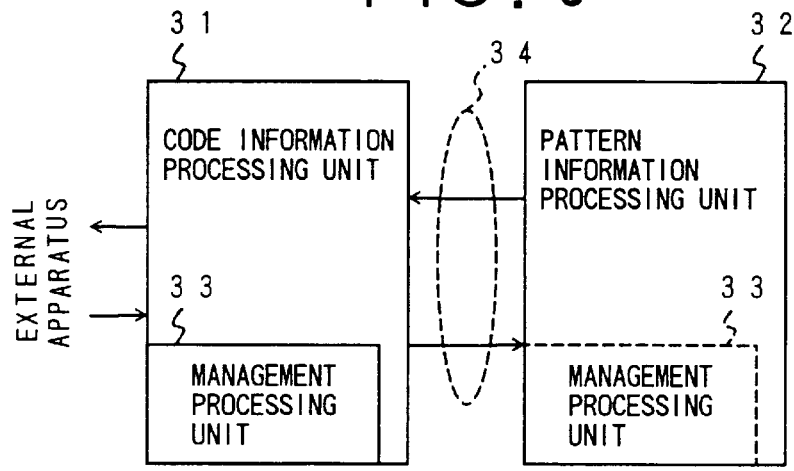
FIG. 6 is a block diagram of a part of a computation control unit provided in the information processing apparatus according to a second embodiment of the present invention.

FIG. 6 is a block diagram of a part of a computation control unit provided in the information processing apparatus according to a second embodiment of the present invention. In the computation control unit shown in FIG. 6, the code information processing unit 31 and the pattern information processing unit 32 are separately provided similarly to the first embodiment. Additionally, the code information processing unit 31 and the pattern information processing unit 32 are connected via the high-speed bus 34. However, the management processing unit 33 is provided in the code information processing unit 31.

It should be noted that the management processing unit 33 may be provided in the pattern information processing unit 32 instead of in the code information processing unit 31. Or the management processing unit 33 may be provided in each of the code information processing unit 31 and the pattern information processing unit 32. The location of the management processing unit 33 may be determined in accordance with a type of processing performed by the information processing apparatus, a desired function of the information processing apparatus and a desired reliability of the information processing apparatus.

The following description of the embodiment is based on the assumption that the management processing unit 33 is provided in each of the code information processing unit 31 and the pattern information processing unit 32, and the processing of the code information processing unit 31 has a priority over the processing of the pattern information processing unit 32.

Figure 7:
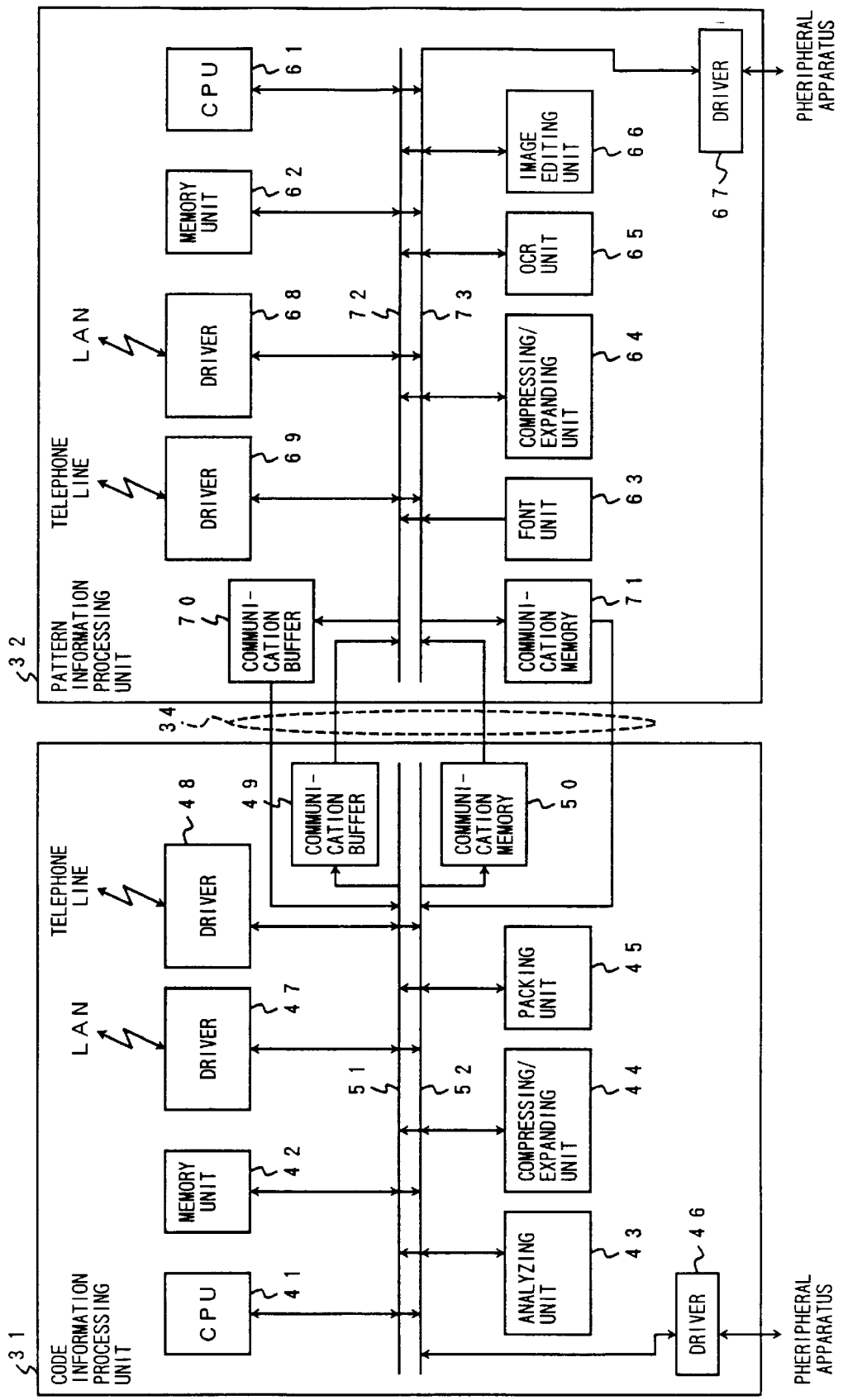
FIG. 7 is a block diagram of the computation control unit shown in FIG. 6.
Figure 8:
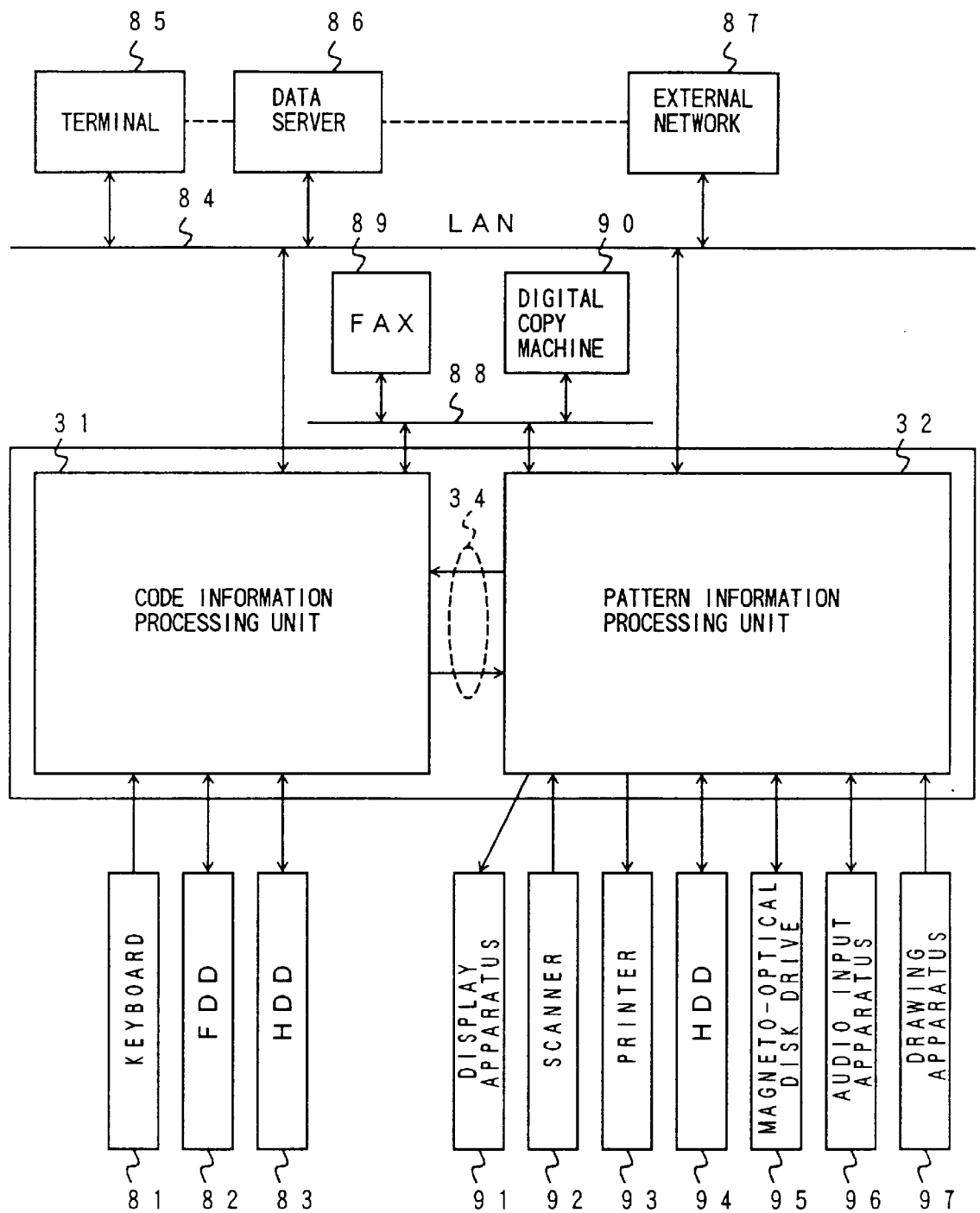
FIG. 8 is a block diagram of a system structure including the information processing apparatus shown in FIG. 7.

FIG. 7 is a block diagram of the computation control unit shown in FIG. 6. FIG. 8 is a block diagram of a system structure including the information processing apparatus shown in FIG. 7.

The code information processing unit 31 comprises a CPU 41, a memory 42, an analyzing unit 43, a compressing/expanding unit 44, a packing unit 45, drivers 46–48, a communication buffer 49, a communication memory 50, a command bus 51 and a data bus 52.

The CPU 41 controls an entire operation of the code information processing unit 31. The memory unit 42 comprises a memory for storing software for an operation system to operate the CPU 41 and an application program and a memory used as a working area of the CPU 41. The analyzing unit 43 analyzes sub-data contained in file data, which comprises main data and the sub-data, supplied by an external apparatus. The main data comprises pattern information and/or code information produced or input by using a peripheral device such as a scanner. The sub-data comprises information for requesting a processing, which information is useful for sorting or searching the main data.

The compressing/expanding unit 44 compresses and expands the pattern information so as to increase a transmitting speed of the pattern information. The packing unit 45 packs the pattern information to be sent to the pattern information processing unit 32 and information for the method and contents of processing.

The driver 46 controls communication with peripheral apparatuses handling the code information such a keyboard 81 and external memory apparatus such as a floppy disk drive (FDD) 82 or a hard disk drive (HDD) 83. The external memory apparatus may store the code information for searching.

The driver 47 controls communications with external apparatus by using a LAN 84 or an external network 87. The external apparatus include various terminals such as a personal computer (an end terminal of a personal computer) or an end terminal of the UNIX SYSTEM and various apparatus including data servers such as a server storing code information, a server such as an electronic filing system storing image information, a server storing video on demand and a server storing application software. External networks such as the Internet, a Wide Area Network (WAN) or Integrated Service Digital Network (ISDN) are also connected to the driver 47.

The driver 48 controls communications with external apparatus connected via a telephone line 88. The external apparatus include a facsimile apparatus (FAX) 89 or a digital copy machine 90 having a facsimile function.

The communication buffer 49 is used for sending various commands to the pattern information processing unit 32 via the high-speed bus 34. The communication memory 50 is used for sending various sets of information to the pattern information processing unit 32 via the high-speed bus 34.

The pattern information processing unit 32 comprises, as shown in FIG. 7, a CPU 61, a memory 62, a font unit 63, a compressing/expanding unit 64, an optical character reader (OCR) unit 65, an image editing unit 66, drivers 67–69, a communication buffer 70, a communication memory, a command bus 72 and a data bus 73.

The CPU 61 controls an entire operation of the code information processing unit 32. The memory unit 62 comprises a memory for storing software for an operation system to operate the CPU 61 and an application program and a memory used as a working area of the CPU 61. The font unit 63 stores a font for converting the code information into the image information.

The compressing/expanding unit 64 compresses and expands the pattern information so as to increase a transmitting speed of the pattern information. The optical character reader (OCR) unit 65 converts the image information into the code information. The image editing unit 66 edits the image information.

The driver 67 controls communication with external memory apparatus such as a display apparatus 91, a scanner 92, a printer 93, a hard disk drive (HDD) 94 or a magneto-optical disk drive 95. The external memory apparatus may store the pattern information.

Similar to the driver 47 of the code information processing unit 31, the driver 68 is connected to various external apparatus including various terminals 85 and various data servers 86 via the LAN 84. The driver 68 controls communications with the external apparatus connected via the LAN 84.

Similar to the driver 48 of the code information processing unit 31, the driver 69 controls communications with external apparatus connected via the telephone line 88. The external apparatus includes the facsimile apparatus (FAX) 89 and the digital copy machine 90 having a facsimile function.

The communication buffer 70 is used for sending various commands to the code information processing unit 31 via the high-speed bus 34. The communication memory 71 is used for sending various sets of information to the code information processing unit 31 via the high-speed bus 34.

The code information processing unit 31 processes various sets of information including key-code information input from the keyboard 81, data comprising main data and sub data sent from the external apparatus via the LAN 84 or the telephone line 88, document information stored as code information in the floppy disk drive 82 or in the hard disk drive 83, and search code information stores in the hard disk drive 83.

When document information is displayed or printed, format information representing such as an arrangement of characters is sent to the pattern information processing unit 32 together with the code information for each character comprising the document information. The pattern information processing unit 32 then converts the code information sent from the code information processing unit 31 into the image information so that the pattern image can be displayed on the display apparatus 91 in accordance with the format information or the pattern information is printed on a recording sheet by the printer 93. A figure processing operation such as a table calculation is also performed by the code information processing unit 31. The image information representing results of the figure processing operation is displayed on a screen of the display apparatus 91 or printed on a recording sheet by the printer 93 by the pattern information processing unit 32.

Figure 1:
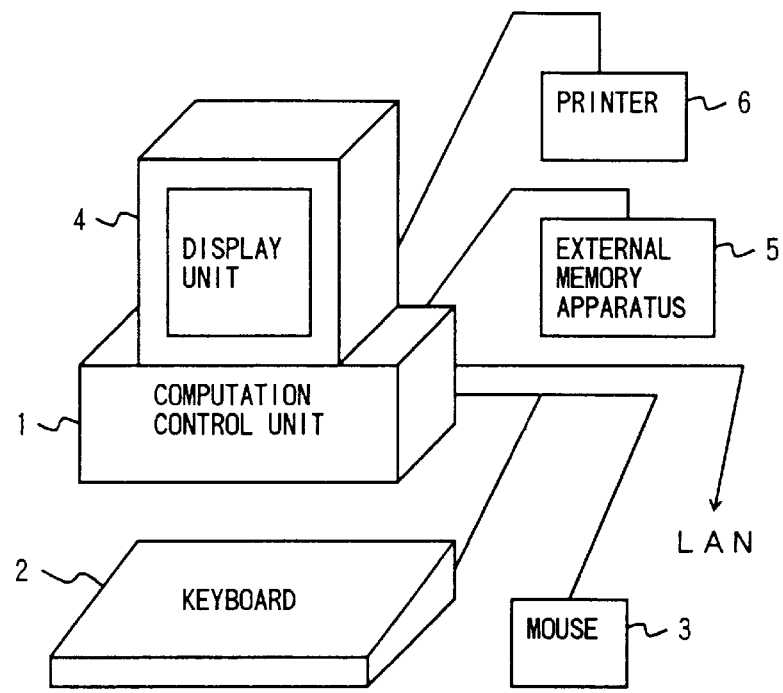
FIG. 1 is an illustration for explaining a conventional information processing apparatus used as a part of an office automation system.
Figure 2:
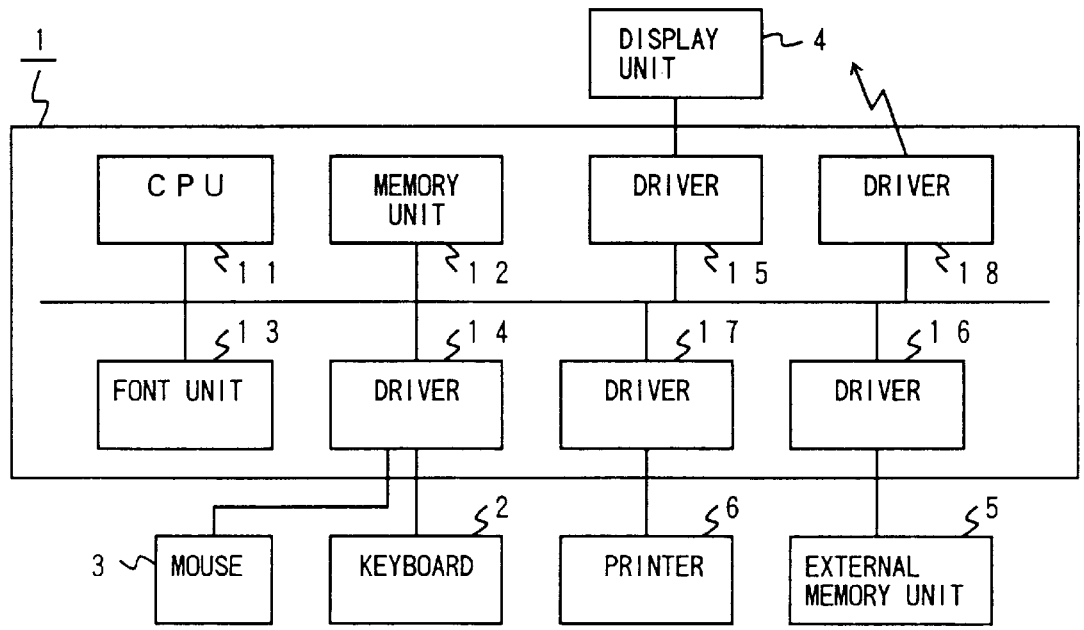
FIG. 2 is a block diagram of a computation control unit shown in FIG. 1.
Figure 3:
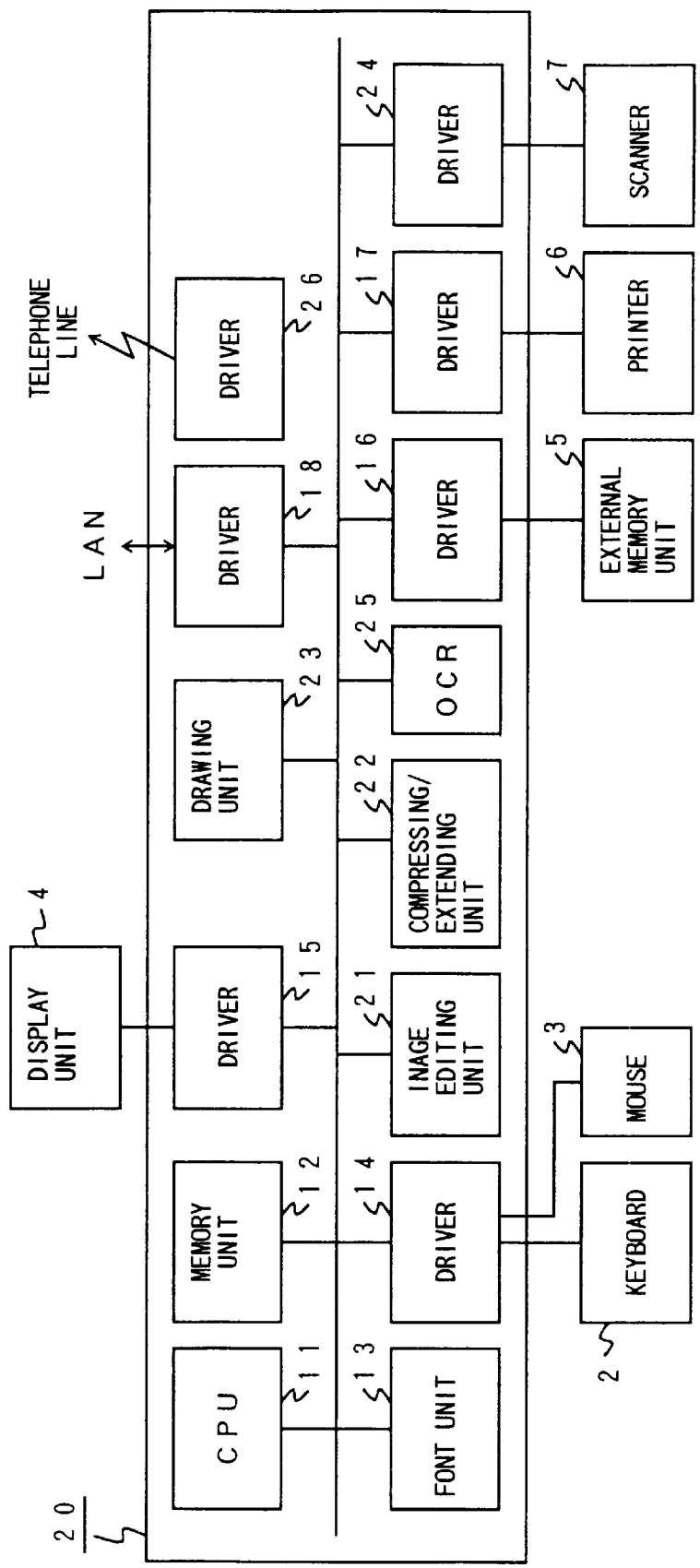
FIG. 3 is a block diagram of a computation control unit of another conventional information processing apparatus.
Figure 4:
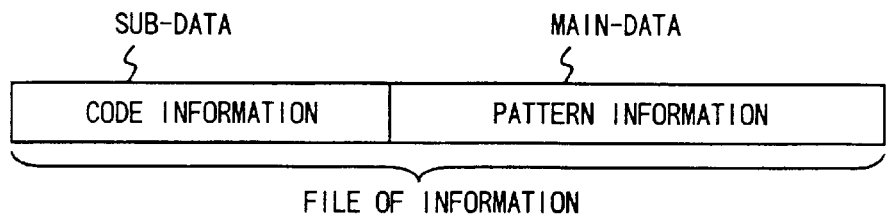
FIG. 4 is an illustration for explaining a data file comprising a sub-data area containing code information and a main-data area containing pattern information.
Figure 9:
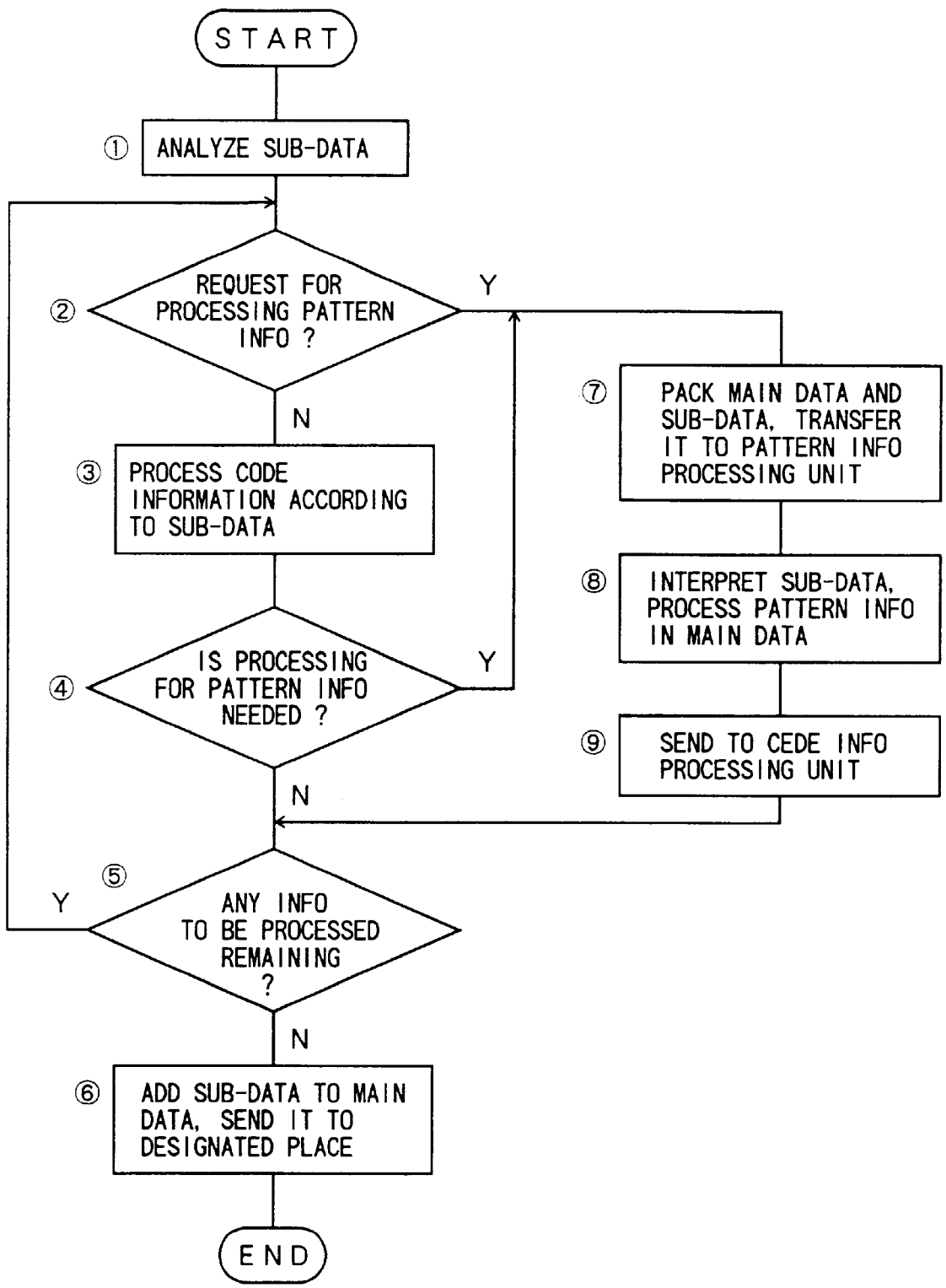
FIG. 9 is a flowchart of a processing performed by the information processing apparatus according to the present invention.

FIG. 9 is a flowchart of a processing performed by the information processing apparatus according to the present invention. The operation of FIG. 9 is started when data packed according to the format shown in FIG. 4, is input from the external apparatus to the code information processing unit 31. When the operation is started, the CPU 41 of the code information processing unit 31 controls, in step 1, the analyzing unit 43 to analyze the sub-data contained in the data sent from the external apparatus. In step 2, it is determined whether or not a processing of the pattern information is requested. If it is determined that the processing of the pattern information is requested, the routine proceeds to step 7.

In step S7, pattern information (corresponding to the main data) and the format information thereof are packed by the packing unit 45. The packed information is transferred to the pattern information processing unit 32 via the communication buffer 49 and the communication memory 50. The pattern information processing apparatus 32 then interprets, in step 8, the sub-data in the information transferred from the code information processing unit 31. The pattern information processing unit 32 processes the pattern information in accordance with results of the interpretation.

Thereafter, in step 9, information representing results of processing is sent back to the code information processing unit 31 via the communication buffer 70 and the communication memory 71. At this time, if the information representing the results of processing is pattern information, the pattern information is compressed by the compressing/expanding unit 64.

After receiving the information from the pattern information processing unit 32, the CPU 41 of the code information processing unit 31 determines, in step 5, whether or not information to be processed still remains. If it is determined that information to be processed remains, the routine returns to step 2 to repeat the above-mentioned steps. If it is determined that there is not information to be processed, the routine proceeds to step 6. In step 6, the information corresponding to the results of processing is determined as main data and the format information and information representing the completion of the processing are added to the main data as sub-data. Then the combined data is transmitted to a designated location.

On the other hand, if it is determined, in step 2, that no request is made for processing the code information, the routine proceeds to step 3. In step 3, the code information in the main data is processed first, and the routine proceeds to step 4. In step 4, it is determined whether or not the processing of the pattern information is needed in accordance with the result of step 3. If it is determined that the processing is needed, the routine proceeds to step 7. Otherwise, the routine proceeds to step 5.

For example, the CPU 41 of the code information processing unit 31 and the CPU 61 of the pattern information processing unit 32 perform the following processing when a request for processing the pattern information is made. The content of the request is "convert the image information in the main data into the code information; develop the code information into image information by using a font; print the developed image information; add the converted code information to the main data and send it back".

That is, the CPU 41 of the code information processing unit 31 packs the image information (main data) and the sub-data representing the method of processing and the format information into a set of data. The CPU 41 transfers the set of data to the pattern information processing unit 32. The CPU 61 of the pattern information processing unit 32 then expands the image information of the main data by the compressing/expanding unit 64. Thereafter, the expanded image information is converted into the code information by the OCR unit 65.

Thereafter, the converted code information is converted into the image information by using a font in the font unit 63. The image information is printed on a recording sheet by the printer 93. At the same time the converted code information is transferred back to the code information processing unit 31. After the CPU 41 of the code information processing unit 31 receives the code information from the pattern information processing unit 32, the format information and the information representing the completion of the processing are added to the received code information. The produced information is sent back to the sender.

As mentioned above, according to the present embodiment, since the code information processing unit 31 of the computation control apparatus of the information processing apparatus is separated from the pattern information processing unit 32, and the code information processing unit 31 and the pattern information processing unit 32 are managed by the management control unit 33, the processing speed and the processing efficiency of for the data including both the code information and the pattern information are greatly improved. Thus, an efficient hardware design can be achieved. Additionally, since the management processing unit 33 is provided in each of the code information processing unit 31 and the pattern information processing unit 32, a reliability of the information processing apparatus can be increased.

Additionally, since the peripheral apparatus relating to input/output of the code information are connected to the code information processing unit 31 and the peripheral apparatus relating to input-output of the pattern information are connected to the pattern information processing unit 32, the information from the peripheral apparatus can be efficiently input to the proper processing unit.

Further, the code information processing unit 31 and the pattern information processing unit 32 are connected via the communication buffers 49 and 70 and the communication memories 50 and 71. The connection can be done irrespective of their data transfer speed and the bit width of the data bus. This enables an easy design with respect to both hardware and software.

It should be noted that, in the abovementioned embodiment, each of the code information processing unit 31 and the pattern information processing unit 32 is connected to the common LAN 84. This is to avoid a situation where pattern information having a large amount of, for example, video information, such as a video on demand, is transferred from an external apparatus to the pattern information processing unit 32 via the code information processing unit 31.

Figure 10:
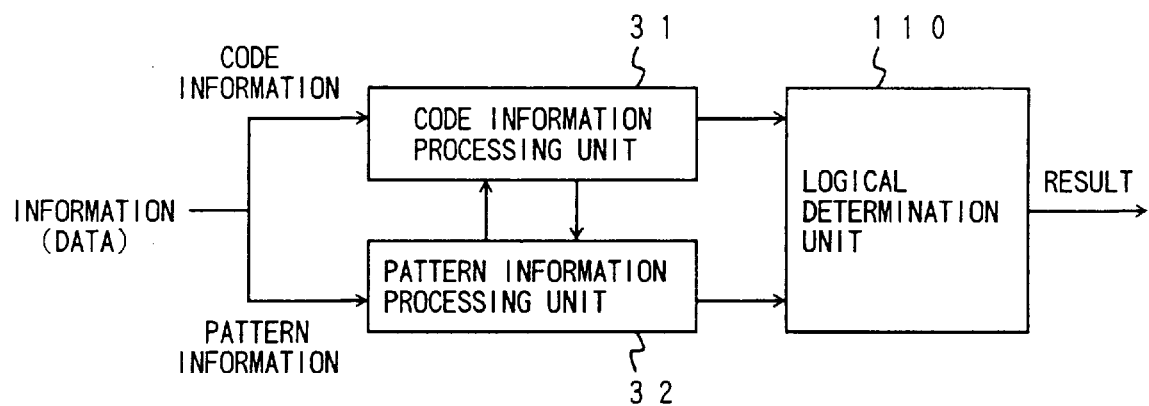
FIG. 10 is a block diagram of a part of the computation control unit provided in the information processing apparatus according to a third embodiment of the present invention.

FIG. 10 is a block diagram of a part of the computation control unit provided in the information processing apparatus according to a third embodiment of the present invention.

The information processing apparatus shown in FIG. 10 processes a set of data comprising main data and sub-data to extract one set of information. The set of data is separated into code information such as, for example, character code, and pattern information such as, for example, character image information obtained from the character code of the sub-data. The character code is input to the code information processing unit 31. The character image information is input to the pattern information processing unit 32.

The character code and the image character code corresponding to the character code are processed by the respective processing units 31 and 32. Then, the results are input to a logical determination unit 110. In the logical determination unit 110, an AND operation is performed on the results of processing of the code information processing unit 31 and the pattern information processing unit 32. That is, the logical determination unit 110 determines whether or not the results of processing of the code information processing unit 31 and the pattern information processing unit 32 are equal to each other. If the results are equal, it can be determined that the set of data is correct.

Specifically, the set of data comprises, for example, image information representing a street address and code information representing a postal number (zone identification code) corresponding to the street address. The street address corresponds to the main data and the postal number corresponds to the sub-data. Thus, the postal number is input to the code information processing unit 31, and the street address is input to the pattern information processing unit 32. The code information processing unit 31 retrieves the code information corresponding to the street address from the floppy disk drive 82 or the hard disk drive 83 by referring to the postal number. The pattern information processing unit 32 converts the image information representing the street address into the code information by the OCR unit 65. The logical determination unit 110 performs the AND operation on the code information obtained by the code information processing unit 31 and the pattern information processing unit 32 so as to determine whether or not the two sets of code information are equal to each other.

According to the above-mentioned third embodiment, a reliability in the results of processing performed by the information processing apparatus can be improved.

In another example, the pattern information processing unit 32 may read characters written on an envelop by the scanner 92. The image information representing the street address and the postal number is converted into the code information by the OCR unit 65. Thereafter, the code information is transferred to the code information processing unit 31. The code information processing unit 31 retrieves the street address data from the floppy disk drive 82 or the hard disk drive 83 based on the code information. The AND operation is performed by the logical determination unit 110 on the code information output from the code information processing unit 31 and the code information corresponding to the street address data received from the pattern information processing unit 32. It is then determined based on the result of the AND operation whether or not the two sets of code information are equal to each other.

Additionally, in a further example, the pattern information processing unit 32 may read image information of a table document. The image information corresponding to figures in the table document is converted into code information by the OCR unit 65. Thereafter, the code information is transferred to the code information processing unit 31. The code information processing unit 31 performs calculations for totaling the figures. The AND operation is performed by the logical determination unit 110 on the code information output from the code information processing unit 31 and the code information corresponding to the total figure received from the pattern information processing unit 32. It is then determined based on the result of the AND operation whether or not the two sets of code information are equal to each other.

In the third embodiment, if a function of one of the code information processing unit 31 and the pattern information processing unit 32 is stopped for some reason, or if one of the code information processing unit 31 and the pattern information processing unit 32 overflows, the other one of processing units 31 and 32 may instead perform the function of the one of the processing units 31 and 32. In such a case, the logical determination unit 110 may perform an OR operation with respect to the result of processing of the code information processing unit 31 and the result of processing of the pattern information processing unit 32. Additionally, by performing other operations such as an exclusive OR operation, various operations may be achieved.

Figure 11:
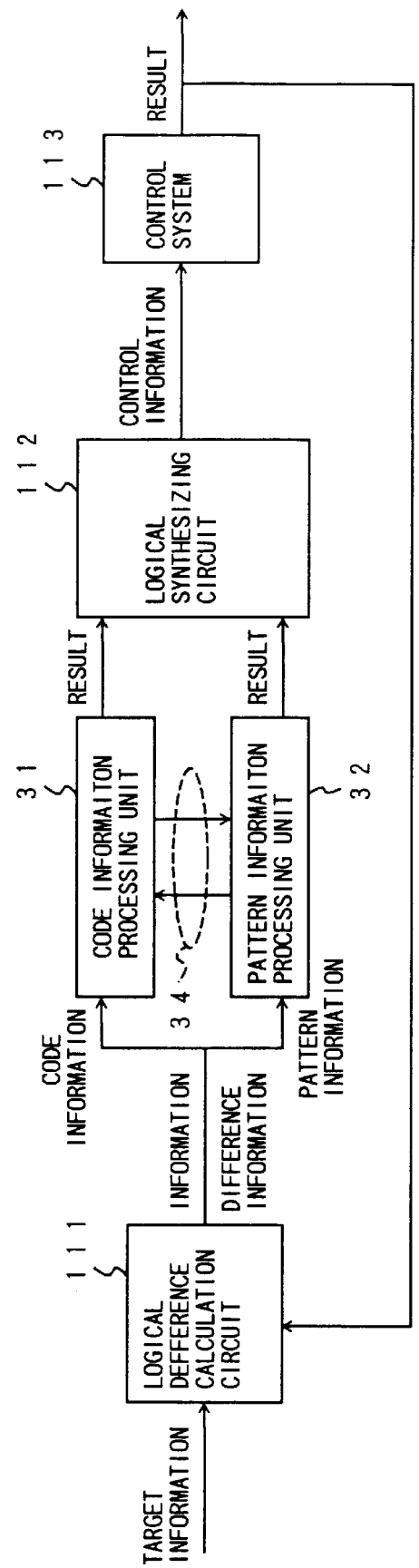
FIG. 11 is a block diagram of a part of the computation control unit provided in the information apparatus according to a fourth embodiment of the present invention.

A description will now be given, with reference to FIG. 11, of a fourth embodiment of the present invention. FIG. 11 is a block diagram of a part of the computation control unit of the information processing apparatus according to the fourth embodiment of the present invention.

In this embodiment, a single set of target information is divided into code information and pattern information by a logical difference calculation circuit 111 so that the code information is input to the code information processing unit 31 and the pattern information is input to the pattern information processing unit 32. The result of processing of the code information processing unit 31 and the result of processing of the pattern information processing unit 32 are synthesized by a logical synthesizing circuit 112. The output of the logical synthesizing circuit 112 is input to a control system 113 which controls an operation of the information processing apparatus.

The fourth embodiment is applicable, for example, to a color printing apparatus in which an intensity of a part of image on a recording sheet is adjusted. That is, the target information which corresponds to color image information is input to the logical difference calculating circuit 111. The target information includes positional information of each part of the image and target intensity information corresponding to the positional information as code information and image information as pattern information. The image represented by the pattern information (image information) is processed by the pattern information processing unit 32 by referring to the corresponding position of which information is supplied by the code information processing unit 31.

The positional information and the image information processed by the pattern information processing unit 32 are synthesized by the logical synthesizing circuit 112. The result is input to the control system 113. The control system 113 uses the output of the logical synthesizing circuit 112 to display or print the image based on the result of the logical synthesizing circuit 112. Then, information of the resultant image is fed back to the logical difference calculation circuit 111. The logical difference calculation circuit 111 compares the code information contained in the target information with the code information included in the information fed back thereto. That is, the intensity of the processed image is compared with the target intensity so as to obtain information with respect to a difference between the intensities. The difference information is output to the code information processing unit 31 so that the intensity of the image processed by the pattern information processing unit 32 is corrected based on the difference information. The above-mentioned operation is repeated until the difference between the intensities is eliminated.

According to the fourth embodiment, an accurate result of processing can be achieved as compared to the second embodiment of the present invention. This embodiment is suitable for apparatus such as a complex color printing machine or an optical character reader.

Figure 12:
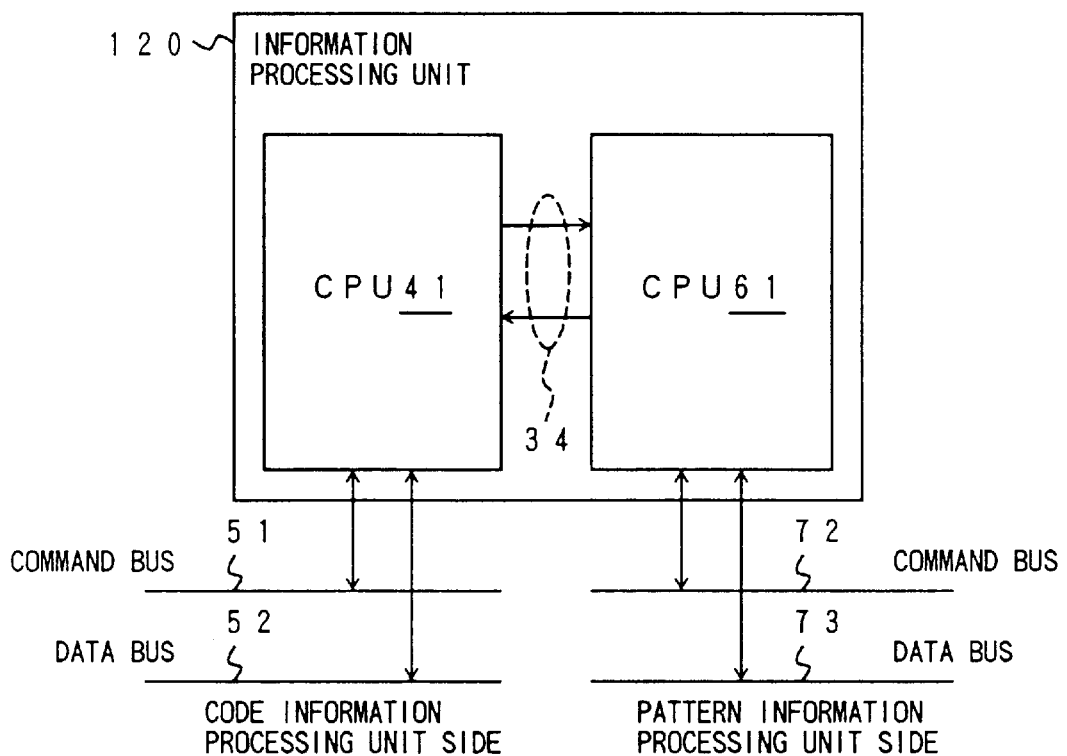
FIG. 12 is a block diagram of a part of the computation control unit of the information processing apparatus according to a fifth embodiment of the present invention.

A description will now be given, with reference to FIG. 12, of a fifth embodiment of the present invention. FIG. 12 is a block diagram of a part of the computation control unit of the information processing apparatus according to the fifth embodiment of the present invention. In FIG. 12, parts that are the same as the parts shown in FIG. 6 are given the same reference numerals, and descriptions thereof will be omitted.

As shown in FIG. 12, in the fifth embodiment, the CPU 41 of the code information processing unit 31 and the CPU 61 of the pattern information processing unit 32 are provided in an information processing unit 120. The information processing unit 120 is formed of a single LSI package. The CPU 41 and the CPU 61 are interconnected by the high-speed bus 34 in the information processing unit 120. The CPU 41 is connected to the command bus 51 and the data bus 52. The CPU 61 is connected to the command bus 72 and the data bus 73. Since the CPU 41 and the CPU 61 are formed in a single chip LSI, an efficient design of the information processing apparatus can be achieved.

The present invention is not limited to the specifically disclosed embodiments, and variations and modifications may be made without departing from the scope of the present invention.

What is claimed is:

1. An information processing apparatus for concurrently processing code information and pattern information, comprising:

a code information processing unit comprising a first CPU exclusively processing the code information;

a pattern information processing unit comprising a second CPU exclusively processing the pattern information, said pattern information processing unit being separated from said code information processing unit; and management control means for controlling inputting/outputting information to/from each of said code information processing unit and pattern information processing unit, wherein each one of said first CPU and said second CPU receives data from the other of said first CPU and said second CPU, and the management control means separates information received from an external apparatus into the code information and the pattern information, and supplies the code information to the code information processing unit and the pattern information to the pattern information processing unit.

2. The information processing apparatus as claimed in claim 1, wherein said management control means is provided in at least one of the code information processing unit and the pattern information processing unit.

3. The information processing apparatus as claimed in claim 1, wherein said management control means is provided in each of said code information processing unit and said pattern information processing unit.

4. The information processing apparatus as claimed in claim 1, wherein peripheral devices handling code information are connected to said code information processing unit, and peripheral devices handling pattern information are connected to said pattern information processing unit.

5. The information processing apparatus as claimed in claim 1, further comprising a bus interconnecting said code information processing unit and said pattern information processing unit.

6. The information processing apparatus as claimed in claim 5, wherein each of said code information processing unit and said pattern information processing unit comprises a memory unit to which said bus is connected.

7. The information processing apparatus as claimed in claim 5, wherein said code information processing unit, said pattern information processing unit and said bus are integrated into a single LSI package.

8. The information processing apparatus as claimed in claim 1, further comprising comparing means for comparing a first output of said code information processing unit with a second output of said pattern information processing unit so as to determine whether or not said second output is equal to said first output, said comparing means determining that said second output is correct when said second output is equal to said first output.

9. The information processing apparatus as claimed in claim 8, wherein a determination of said comparing means is made by performing an AND operation with respect to said first output and said second output.

10. The information processing apparatus as claimed in claim 1, wherein a set of information including the code information and the pattern information is input to said management control means, and said management control means separates the code information and the pattern information from each other so that the code information is input to said code information processing unit and the pattern information is input to said pattern information processing unit.

11. An information processing apparatus for concurrently processing code information and pattern information, comprising:
    a code information processing unit exclusively processing the code information;
    a pattern information processing unit exclusively processing the pattern information, said pattern information processing unit being separated from said code information processing unit;
    management control means for controlling inputting/outputting information to/from each of said code information processing unit and pattern information processing unit;
    synthesizing means for synthesizing a first output of said code information processing unit and a second output of said pattern information processing unit in accordance with a logical operation so as to output a third output;
    a control system controlling an operation in accordance with the third output supplied by said synthesizing means so as to feed back a result of processing performed by said code information processing unit and said pattern information processing unit; and
    difference calculation means for calculating a difference between target information input from external apparatus and the result of processing so as to input the difference to said code information processing unit to correct the second output of said pattern information processing unit.

12. The information processing apparatus as claimed in claim 11, wherein the code information processing unit includes a first CPU, the pattern information processing unit includes a second CPU, and each one of the first CPU and the second CPU receives data from the other of the first CPU and the second CPU.

13. An information processing system for concurrently processing code information and pattern information, comprising:
    a code information processing unit comprising a first CPU exclusively processing the code information;
    a pattern information processing unit comprising a second CPU exclusively processing the pattern information, said pattern information processing unit being separated from said code information processing unit; and
    management processing unit which controls inputting/outputting information to/from each of said code information processing unit and pattern information processing unit,
    wherein each one of said first CPU and said second CPU receives data from the other of said first CPU and said second CPU.

14. The system as claimed in claim 13, wherein said management processing unit is provided in at least one of the code information processing unit and the pattern information processing unit.

15. The system as claimed in claim 13, wherein said management processing unit is provided in each of said code information processing unit and said pattern information processing unit.

16. The system as claimed in claim 13, wherein peripheral devices handling code information are connected to said code information processing unit, and peripheral devices handling pattern information are connected to said pattern information processing unit.

17. The system as claimed in claim 13, further comprising a bus interconnecting said code information processing unit and said pattern information processing unit.

18. The system as claimed in claim 17, wherein each of said code information processing unit and said pattern information processing unit comprises a memory unit to which said bus is connected.

19. The system as claimed in claim 17, wherein said code information processing unit, said pattern information processing unit and said bus are integrated into a single LSI package.

20. The system as claimed in claim 13, further comprising a logical determination unit which compares a first output of said code information processing unit with a second output of said pattern information processing unit so as to determine whether or not said second output is equal to said first output, said logical determination unit determining that said second output is correct when said second output is equal to said first output.

21. The system as claimed in claim 20, wherein a determination of said logical determination unit is made by performing an AND operation with respect to said first output and said second output.

22. The system as claimed in claim 13, wherein a set of information including the code information and the pattern information is input to said management processing unit, and said management processing unit separates the code information and the pattern information from each other so that the code information is input to said code information processing unit and the pattern information is input to said pattern information processing unit.

23. An information processing system for concurrently processing code information and pattern information, comprising:
    a code information processing unit exclusively processing the code information;
    a pattern information processing unit exclusively processing the pattern information, said pattern information processing unit being separated from said code information processing unit;

management processing unit which controls inputting/ outputting information to/from each of said code information processing unit and pattern information processing unit;

a logical synthesizing circuit which synthesizes a first output of said code information processing unit and a second output of said pattern information processing unit in accordance with a logical operation so as to output a third output;

a control system controlling an operation in accordance with the third output supplied by said logical synthesizing circuit so as to feed back a result of processing performed by said code information processing unit and said pattern information processing unit; and a logical difference calculation circuit which calculates a difference between target information input from external apparatus and the result of processing so as to input the difference to said code information processing unit to correct the second output of said pattern information processing unit.

24. The system as claimed in claim 23, wherein the code information processing unit includes a first CPU, the pattern information processing unit includes a second CPU, and each one of the first CPU and the second CPU receives data from the other of the first CPU and the second CPU.

* * * * *